United States Patent [19]

Bye et al.

[11] 4,243,782

[45] Jan. 6, 1981

[54] TRANSITION METAL COMPOUND

[75] Inventors: Ashley D. Bye; Alan B. Newton, both of Welwyn Garden City, England

[73] Assignee: Imperial Chemical Industries Limited, London, England

[21] Appl. No.: 696,822

[22] Filed: Jun. 16, 1976

[30] Foreign Application Priority Data

Jun. 16, 1975 [GB] United Kingdom ............... 25534/75
Jan. 23, 1976 [GB] United Kingdom ................ 2697/76

[51] Int. Cl.$^3$ ........................... C08F 4/66; C08F 10/06
[52] U.S. Cl. ................................. 526/140; 252/429 B; 525/247; 526/65; 526/139; 526/351
[58] Field of Search ............................ 252/429 B, 441; 526/140, 348; 260/878 B

[56] References Cited

U.S. PATENT DOCUMENTS

| | | | |
|---|---|---|---|
| 3,026,311 | 3/1962 | Coover et al. ...................... | 526/140 |
| 3,058,970 | 10/1962 | Rust et al. ........................... | 526/351 |
| 3,318,858 | 5/1967 | Nakaguchi et al. ................. | 526/140 |
| 3,562,239 | 2/1971 | de Jong et al. ...................... | 526/153 |
| 3,629,368 | 12/1971 | Fukuda et al. ..................... | 260/878 B |
| 3,639,515 | 2/1972 | Hagermeyer et al. ............ | 260/878 B |
| 3,670,053 | 6/1972 | Sennari et al. .................... | 260/878 B |
| 3,825,524 | 7/1974 | Wada et al. ......................... | 526/142 |
| 3,972,866 | 8/1976 | Fortuin et al. ...................... | 526/139 |

FOREIGN PATENT DOCUMENTS

2407095 9/1974 Fed. Rep. of Germany .
1374568 8/1964 France .

*Primary Examiner*—Edward J. Smith
*Attorney, Agent, or Firm*—Cushman, Darby & Cushman

[57] ABSTRACT

A reaction product of a transition metal compound, for example titanium tetrachloride, and an organo-compound of a non-transition metal, for example an aluminium dialkyl halide, is treated with a sulphur containing organic compound, in an amount of up to 2.00, preferably up to 1.50 molar relative to the transition metal compound. The mixture is heated to a temperature in the range from 60° C. up to 160° C. Before treating with the sulphur compound, the reaction product can be heated to a temperature of up to 160° C. The Lewis Base compound is a sulphone, a sulphonamide or a fused-ring heterocyclic compound such as phenoxathiin. The product obtained can be used as a component of an olefine polymerization catalyst.

16 Claims, No Drawings

TRANSITION METAL COMPOUND

The present invention relates to transition metal compounds and their production, and also to the use of such compounds as components of catalysts for the polymerisation of olefine monomers.

According to the present invention there is provided a process for the production of a transition metal composition which comprises mixing at least one compound of a transition metal of Groups IVA to VIA of the Periodic Table with at least one organo-compound of aluminium or of a non-transition metal of Groups IA or IIA of the Periodic Table to obtain a solid reaction product, and contacting the solid reaction product with at least one sulphur-containing organic compound of the formula

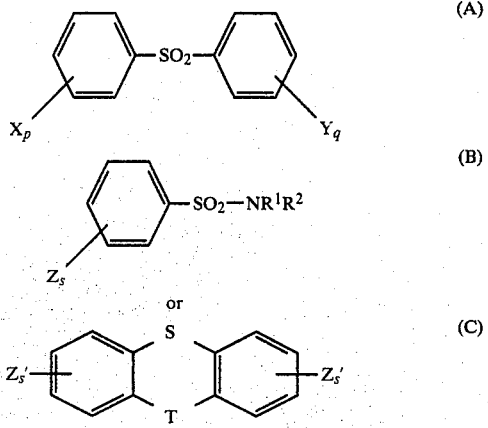

in an amount of from 0.01 up to 2.00 mole, of the sulphur-containing organic compound for each gram atom of the transition metal which is present in the reaction product, the contacting being effected, at least partially, at a temperature in the range from 60° C. up to 160° C., wherein X, or each X, is, independently, a halogen atom, an alkyl, aryl, alkoxy, aryloxy, alkylthio, or arylthio group, or a group $-NR^3R^4$, or two groups X can together form a saturated or unsaturated hydrocarbon ring;

Y, or each Y, is, independently, a halogen atom, an alkyl, aryl, alkoxy, aryloxy, alkylthio or arylthio group, or a group $-NR^3R^4$, or two groups Y can together form a saturated or unsaturated hydrocarbon ring; or a group X and a group Y may be replaced by a link between the two phenyl groups attached to the $-SO_2-$ group, the linkage being either direct or through a group $-O-$, $-CH_2-$, $-NR^3-$, $-S-$ or $-CO-$;

Z, or each Z, is, independently, a halogen atom, an alkyl, aryl, alkoxy, aryloxy, alkylthio, or arylthio group, or a group $-NR^3R^4$, or two groups Z can together form a saturated or unsaturated hydrocarbon ring;

$R^1$ is a hydrocarbyl group;
$R^2$ is a hydrocarbyl group or a group

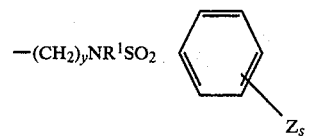

$R^3$ is a hydrogen atom or a hydrocarbyl group;
$R^4$ is a hydrocarbyl group;
p, q and s are each, independently, an integer from 0 up to 5;
y is a positive integer;
Z', or each Z', is, independently, a halogen atom, an alkyl, aryl, alkoxy, aryloxy, alkylthio or arylthio group, or a group $-NR^3R^4$; and
T is an oxygen or sulphur atom, or a group $-NR^1-$ or $-CO-$.

For convenience, a sulphur-containing organic compound of the formula (A), (B) or (C) will be referred to as "a sulphur compound".

The transition metal can be, for example, zirconium, vanadium or preferably titanium and it is preferred that the compound of the transition metal is a halide or oxyhalide, especially a chloride. In the compound of the transition metal, the metal is in a valency state greater than its minimum valency state and is preferably in its maximum valency state. Preferably the compound of the transition metal is a liquid, or a solid which is readily soluble in hydrocarbons, particularly aliphatic hydrocarbons, and is reduced to a hydrocarbon insoluble product on mixing with the organo-compound of a non-transition metal or aluminium. A particularly suitable compound of a transition metal is titaniumtetrachloride.

The organo-compound of aluminium or of a non-transition metal of Groups IA or IIA of the Periodic Table (hereafter referred to as the "organo-metallic compound"), is one in which at least one hydrocarbyl group is joined to a metal atom either directly or through an oxygen or nitrogen atom. The organo-metallic compound can be a complex compound such as $Mg(AlEt_4)_2$ or a lithium aluminium tetraalkyl. However, it is preferred that the organo-metallic compound is an organo-aluminium compound, and particularly that it is, or contains, a dialkyl aluminium halide, for example diethyl aluminium chloride or ethyl aluminium sesquichloride which may be regarded as being an equimolar mixture of diethyl aluminium chloride and ethyl aluminium dichloride.

A preferred process in accordance with the present invention comprises mixing titanium tetrachloride with a dialkyl aluminium halide, or mixture containing a dialkyl aluminium halide, in the presence of an inert liquid hydrocarbon at a temperature of from $-60°$ C. up to $+20°$ C. to obtain a solid titanium trichloride-containing reaction product, and contacting the reaction product with at least one sulphur-containing organic compound of the formula

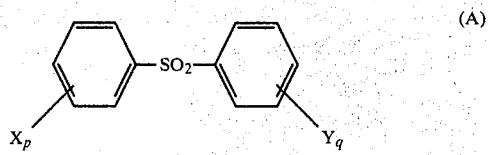

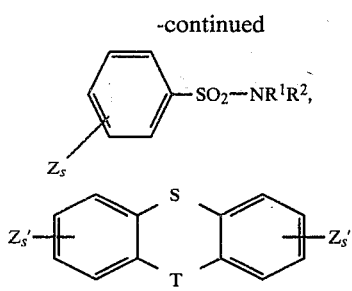

in an amount of from 0.01 up to 1.50 mole of the sulphur-containing organic compound for each gramme atom of titanium which is present in the reaction product, the contacting being effected, at least partially, at a temperature in the range from 60° C. up to 160° C., wherein $R^1$, $R^2$, X, Y, Z, Z', p, q and s are all as hereinbefore defined.

The mixing of the compound of the transition metal with the organo-metallic compound is conveniently effected by adding a solution, in an inert diluent, of the organo-metallic compound to a solution, in the same diluent, of the compound of the transition metal. The temperature at which the mixing is effected is dependent on the compounds being mixed together. When the organo-metallic compound is an organo-aluminium compound, the temperature of mixing is, in general, in the range from −100° C. up to 20° C. but, when using dialkyl aluminium halides, or a mixture thereof with an alkyl aluminium dihalide, we prefer to use temperatures in the range from −40° C. up to +15° C., for example 0° C. If a stronger reducing agent is used, for example an aluminium trialkyl or a dialkyl aluminium hydride, it is preferred to effect the mixing at lower temperatures, which may be as low as −100° C. up to −40° C., for example −70° C. The time of mixing will be dependent on the nature of the compound of the transition metal and the organo-metallic compound, and the reaction conditions used but in general, times of from 30 minutes up to 20 hours, particularly from 2 hours up to 14 hours, can be used.

The relative proportions of the compound of the transition metal and the organo-metallic compound are dependent on the particular compounds, or mixtures of compounds, which are mixed together but in general from 0.2 up to 2.0 moles of the organo-metallic compound are used for each mole of the transition metal compound. Using titanium tetrachloride and a dialkyl aluminium halide, or mixture including a dialkyl aluminium halide, such as for example a mixture of a dialkyl aluminium halide and an alkyl aluminium dihalide, it is preferred to use from 0.6 up to 1.5 moles, for example 0.9 mole, of the dialkyl aluminium halide for each mole of the titanium tetrachloride. However, using titanium tetrachloride and an aluminium trialkyl or a dialkyl aluminium hydride, it is preferred to use from 0.2 up to 0.4 moles of the aluminium trialkyl or dialkyl aluminium hydride for each mole of the titanium tetrachloride.

The solid reaction product obtained by mixing the compound of the transition metal with the organo-metallic compound is preferably removed from the reaction medium and washed with an inert liquid hydrocarbon before the sulphur compound is added. The solid reaction product may be subjected to a preliminary heating step before contacting with the sulphur compound. This preliminary heating step may be at a temperature in the range from 60° C. up to 160° C., preferably from 80° C. up to 150° C., especially up to 130° C., for a time of at least one minute up to 25 hours, for example from 2 up to 14 hours. A convenient method of effecting the preliminary heating step is by merely heating the solid reaction product to a temperature in the range from 60° C. up to 160° C., preferably from 80° up to 150° C., especially up to 130° C., terminating the heating on attaining the desired temperature, allowing the solid to settle and removing the supernatant liquid. If the solid reaction product is obtained from titanium tetrachloride, it is preferred that the heating conditions (that is the combination of time and temperature) during the preliminary heating step are such that the solid reaction product is transformed into a metastable red material (as hereinafter defined). By "metastable red material" we mean a titanium trichloride-containing material which is red in colour and which, when treated with di-n-butyl ether or di-isoamyl ether, changes colour from red to brown and gives rise to a darkcoloured supernatant liquid. This metastable red material in general possesses a layer structure of the type which is present in the α- or γ-forms of titanium trichloride.

The amount of the sulphur compound added is preferably at least 0.02 and not more than 1.50, especially from 0.05 up to 1.2 mole for each gramme atom of the transition metal which is present in the solid reaction product. However, it should be appreciated that the preferred amount of the sulphur compound will depend on the nature of the sulphur compound.

The temperature at which the mixture of the solid reaction product and the sulphur compound is heated is preferably at least 90° C., temperatures in the range from 100° C. up to 145° C. being particularly preferred. The solid reaction product and the sulphur compound may be mixed at a temperature below 60° C., for example at ambient temperature, and then heated up to a temperature of from 60° C. up to 160° C. However, if large proportions of the sulphur compound are used relative to the transition metal content of the reaction product, for example 0.30 mole or more for each gramme atom of the transition metal, the proportions being dependent on the sulphur compound, and the solid reaction product has not been subjected to the preliminary heating step, the solid reaction product preferably should be heated up to the temperature in the range from 60° C. up to 160° C. before adding all of the sulphur compound. Alternatively, it may be preferred that the solid reaction product is heated up to, and maintained at, the temperature in the range from 60° C. up to 160° C. for a period of time, for example from 15 minutes up to 5 hours, and the sulphur compound is then added to the solid reaction product whilst it is being maintained at the temperature in the range from 60° C. up to 160° C.

The mixture of the solid reaction product and the sulphur compound is conveniently maintained at the temperature in the range from 60° C. up to 160° C. for at least 30 minutes and not more than 25 hours, and it is preferred that the mixture is maintained at the elevated temperature for a time of from 2 up to 12 hours.

The heating of the mixture of the reaction product and the sulphur compound to a temperature in the range of from 60° C. up to 160° C., may be effected in the presence of one or more other components, such as an organo-metallic compound of aluminium or of a non-transition metal of Groups IA or IIA of the Periodic Table, particularly an organo-aluminium compound such as a dialkyl aluminium halide. The number of moles of any such other component is desirably less than the number of gramme atoms of the transition metal which is present in the reaction product, and is conveniently in the range from 0.10 up to 0.40, for example 0.25 mole for each gramme atom of the transition metal which is present in the reaction product.

The heating of the mixture of the reaction product and the sulphur compound can be effected in two stages, with the mixture being washed after the first stage and then subjected to a further heating stage.

After the mixture has been heated at the elevated temperature, it may, optionally, be washed. The washing can be effected by decanting off the supernatant liquor, resuspending the product in a quantity of fresh liquid hydrocarbon, allowing the product to settle and decanting off the supernatant liquor. The washing procedure is preferably repeated and may be effected several times, for example three or more. Any suitable liquid hydrocarbon can be used to wash the product. The supernatant liquor removed in the first decantation may be recycled and used to treat a further sample of the solid reaction product of the compound of a transition metal and the organo-metallic compound. If the liquor is recycled in this manner, it will be necessary to add a further quantity of the sulphur compound to replace that used in the first treatment. Alternatively, the sulphur compound can be recovered from the liquor obtained from the first decantation, and then used as desired. It has been found that, with certain sulphur compounds, complexes are formed which cause agglomeration of the catalyst particles, and to reverse this agglomeration we prefer to use aromatic liquids such as benzene, toluene or xylene to wash the product.

In the sulphur compound of formula A, if X or Y are alkyl, alkoxy or alkylthio groups, it is preferred that the group contains from 1 up to 6 carbon atoms. It is preferred that p and q are zero or one and the groups X and Y are preferably the same. The groups $R^3$ and $R^4$ are conveniently alkyl groups having from 1 up to 6 carbon atoms. If the groups X and Y are replaced by a link between the two phenyl groups attached to the —SO$_2$— group, the linkage is conveniently direct through an oxygen atom or especially through a —CH$_2$— group. Compounds of formula A include diphenyl sulphone, 4(phenylthio)diphenylsulphone, 4(phenoxy)diphenylsulphone, 2,4'-(diphenoxy)diphenylsulphone, 4,4'-(diphenoxy)diphenylsulphone, 4,4'-dichlorodiphenylsulphone, 4,4'-(dimethyl)-diphenylsulphone, 2,4,4'-(trimethyl)diphenylsulphone, 6-phenylsulphonyltetralin, dibenzothiophen-5,5-dioxide, phenoxathiin-10,10-dioxide and thioxanthene-10,10-dioxide.

In the sulphur compound of formula B, the groups $R^1$, $R^2$ and $R^3$ are conveniently alkyl groups having from 1 up to 6 carbon atoms, but one, or both, of the groups $R^1$ and $R^2$ can be an aryl group. The group Z can be a bromine or a chlorine atom, or a phenoxy group. In the group

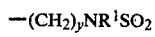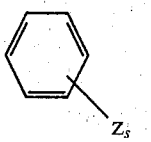

y is conveniently 1, 2 or 3 and s is zero. Compounds of formula B include N,N-dimethylbenzenesulphonamide, N,N-diethylbenzenesulphonamide, N,N-dibutylbenzenesulphonamide, N,N-diphenylbenzenesulphonamide, N-methyl-N-phenyl-4-bromobenzenesulphonamide, N-methyl-N-phenyl-4-chlorobenzenesulphonamide, N,N-diethyl-4-phenoxybenzenesulphonamide and N,N'-dibenzene-sulphonyl-N,N'-dimethyl-1,2-diaminoethane.

In the sulphur compound of formula C, if each s is zero, then when T is an oxygen atom, the compound is phenoxathiin, when T is a sulphur atom, the compound is thianthrene and when T is a group —NR$^1$—, the compound is an N-hydrocarbylphenothiazine such as N-methylphenothiazine. Substituted compounds such as 2,8-dimethylphenoxathiin; 3,7-dimethylphenoxathiin or 3-methylphenoxathiin may also be used.

A particularly useful material is obtained when the solid reaction product of titanium tetrachloride and diethyl aluminium monochloride, or a mixture thereof with ethyl aluminium dichloride, is heated up to a temperature in the range of from 60° C. up to 160° C. and contacted with thianthrene or, especially, phenoxathiin or 3-methylphenoxathiin and the mixture heated at a temperature of from 60° C. up to 160° C. It will be appreciated that the solid reaction product is heated at 60° C. up to 160° C. either in a preliminary heating step, or is heated up to a temperature in the range of from 60° C. up to 160° C. before adding the thianthrene, phenoxathiin or 3-methylphenoxathiin, the latter compounds being added to the solid reaction product at the desired elevated temperature.

The product obtained by the process of the present invention includes a solid transition metal compound wherein the transition metal has a valency less than its maximum valency, and is very preferably a form of titanium trichloride. The product of the process of the present invention is suitable for use as one component of an olefine polymerisation catalyst.

Thus, according to a further aspect of the present invention, there is provided an olefine polymerisation catalyst comprising:

(1) a solid transition metal compound which is the product of mixing at least one compound of a transition metal of Groups IVA to VIA of the Periodic Table with at least one organo-compound of aluminium or of a non-transition metal of Groups IA or IIA of the Periodic Table to obtain a solid reaction product, and contacting the reaction product with at least one sulphur-containing organic compound of the formula (A), (B) or (C), in an amount of from 0.01 up to 2.00 mole of the sulphur-containing organic compound for each gramme atom of the transition metal which is present in the reaction product, the contacting being effected, at least partially, at a temperature in the range from 60° C. up to 160° C., wherein formulae (A), (B) and (C) are all as hereinbefore specified; and (2) at least one organo-metallic compound of aluminium or of a non-transition metal of Group IIA of the Periodic System, or a complex of an organo-metallic compound of a non-transition metal of Group IA or IIA of the Periodic System and an organo-aluminium compound.

Component (1) of the catalyst system is a material obtained by the procedure hereinbefore described.

Component (2) is an organo-metallic compound which can be a Grignard reagent which is substantially ether free or a compound of the type MgR$_2$ where R is a hydrocarbyl group, for example Mg(C$_6$H$_5$)$_2$. If the organo-metallic compound is a complex, it can be, for example, a material such as Mg[Al(C₂H₅)₄]₂ or a lithium aluminium tetra-alkyl. It is however preferred that component (2) is an organo-aluminium compound such as a bis(dialkyl aluminium)oxyalkane, a bis(dialkyl aluminium)oxide, an aluminium hydrocarbyl sulphate, an aluminium hydrocarbyl oxyhydrocarbyl or particularly an aluminium trihydrocarbyl or dihydrocarbyl aluminium hydride or halide, especially an aluminium trialkyl such as aluminium triethyl or a dialkyl aluminium halide such as diethyl aluminium chloride. A mixture of compounds can be used if desired, for example a mixture of an aluminium trialkyl and a dialkyl aluminium halide.

In addition to components (1) and (2) the catalyst can include one or more further components. Thus the catalyst can include at least one organo-Lewis Base compound (component (3)). This organo-Lewis Base compound can be a material of the type which is used in the production of component (1) of the catalyst, that is a sulphur-containing organic compound of the formula (A), (B) or (C). However, other organo-Lewis Base compounds can be used, such as, for example thioesters and esters such as methyl methacrylate; ethers and thioethers; alcohols and thiols; ketones and thioketones; organo-silicon compounds such as the silanes and siloxanes; amides such as formamide; urea and thiourea and the substituted derivatives thereof such as N,N,N',N'-tetramethylurea and alkanolamines such as β-dimethylaminoethanol. The other organo-Lewis Base compounds can be materials of the formulae $$R^5R^6R^7P(O)_m \qquad (D)$$

where
  $R^5$, $R^6$ and $R^7$ are each independently an alkyl or aryl group, or a group $-NR_2^8$ or $-OR^8$;
  $R^8$ is an alkyl group of 1 to 4 carbon atoms; and
  m is 0 or 1; or $$R^9R^{10}R^{11}N \qquad (E)$$

where
  $R^9$ and $R^{10}$ are each independently a hydrocarbyl group; and
  $R^{11}$ is a hydrogen atom, an alkyl group or a group $$-C_nH_{2n}NR^9R^{10};$$

or $R^9$ and $R^{10}$, optionally with $R^{11}$, together form a substituted or unsubstituted, saturated or unsaturated, condensed or uncondensed ring system; and n is 1, 2 or 3; or $$R^{12}R^{13}P(Q)_zED \qquad (F)$$

wherein
  $R^{12}$ is a halogen atom, a hydrocarbyl group, a group $-NR_2^{14}$ or $-OR^{14}$, a heterocyclic group or a group (E—L—G);
  $R^{13}$ is a halogen atom, a hydrocarbyl group, a group $-NR_2^{14}$ or $-OR^{14}$, a heterocyclic group, a group (E—L—G) or ED;
  $R^{14}$ is a hydrocarbyl group; each E is —O—, —S—, or —NR^{14}—, and may be the same or different;
  G is $-OR^{14}$, $-SR^{14}$, $-NR^{14}_2$, $-PR^{14}_2$ or a heterocyclic ring system whereof the heteroatom is O, S, N, or P;
  D is a group —LG or $$-P(Q)_zR^{12}R^{13},$$

or, when
  $R^{13}$ is ED, both the D groups may together form a group —L—;
  L is a bivalent hydrocarbyl radical such that E and G or E and E are separated by not more than 3 carbon atoms;
  Q is an oxygen or sulphur atom; and
  z is 0 or 1.

More specifically, in the organo-Lewis Base compound of formula D, if the groups $R^5$, $R^6$ and $R^7$ are alkyl groups, they preferably contain from 1 up to 6 carbon atoms. The groups $R^5$, $R^6$ and $R^7$ are preferably all the same and m is one. $R^5$, $R^6$ and $R^7$ are preferably all aryl groups or all dialkylamino groups but if $R^5$ and $R^6$ are both dimethylamino groups, then $R^7$ may be an alkoxy group. Compounds of formula D include tributyl phosphine; triphenyl phosphine; tributyl phosphine oxide; triphenyl phosphine oxide; ethyl N,N,N',N'-tetramethylphosphorodiamidate and hexamethylphosphoric triamide.

In the organo-Lewis Base compound of formula E, it is preferred that $R^{11}$ is an alkyl group or a group $-C_nH_{2n}NR^9R^{10}$. $R^9$, $R^{10}$ and $R^{11}$ can all be the same and can be alkyl groups containing from 1 up to 6 carbon atoms. If $R^9$ and $R^{10}$ form a ring system, then $R^{11}$ can be included with $R^9$ and $R^{10}$ in the ring system or can be a hydrogen atom or an alkyl group. If the group $R^{11}$ is $-C_nH_{2n}NR^9R^{10}$, n is preferably 2 and $R^9$ and $R^{10}$ are conveniently methyl groups. Compounds of formula E include di-n-butylamine, triethylamine, tri-n-butylamine, N,N,N',N'-tetramethylethylenediamine, pyridine, piperidine, picoline, quinoline or isoquinoline.

In the compound of formula F, the group D is a group -LG, in which case the compound is of the type $$R^{12}R^{13}P(Q)_z(E-L-G), \qquad (F1)$$

or the group D is a group $$-P(Q)_zR^{12}R^{13},$$

in which case the compound is of the type $$R^{12}R^{13}P(Q)_zEP(Q)_zR^{12}R^{13} \qquad (F2)$$

or the group $R^{13}$ is ED and the groups D together form a group —L—, in which case the compound is of the type

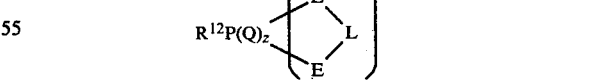
(F3)

In compounds of the type F1 and F2, the groups $R^{12}_1$ and $R^{13}$ are conveniently the same, and are alkylamino groups $-NR_2^{14}$ or alkoxy groups $-OR^{14}$ in which $R^{14}$ is a methyl or ethyl group. The group (E-L-G) can be, for example, of the type $$-O(CH_2)_xOR^{14};$$

$$-O(CH_2)_xNR_2^{14};$$

$$-NR^{14}(CH_2)_xNR_2^{14}$$

or

—S(CH$_2$)$_x$NR$_2^{14}$, where x is an integer, particularly 2 or 3.

In compounds of the type F3, the group

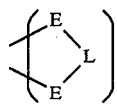

can be, for example, of the type

—O(CH$_2$)$_x$O—;

—O(CH$_2$)$_x$NR$^{14}$—;

—NR$^{14}$(CH$_2$)$_x$NR$^{14}$— or

—S(CH$_2$)$_x$NR$^{14}$—, where x is as defined. In compounds of the type F1 and F3, it is preferred that at least one of the groups E is —NR$^{14}$. However, in compounds of the type F2, the group E joining the two groups —P(Q)$_z$R$^{12}$R$^{13}$ is preferably an oxygen atom. It is preferred that z, or each z, is one and Q, or each Q, is an oxygen atom. Compounds of formula F include N,N,N',N',N''-pentamethyl-N''-β-dimethylaminoethylphosphoric triamide; 2-dimethylamino-1,3-dimethyl-1,3,2-diazaphospholidine-2-oxide; β-dimethylaminoethyl-N,N,N',N'-tetramethylphosphorodiamidate; 2-ethoxy-1,3-dimethyl-1,3,2-diazaphospholidine-2-oxide; 2-dimethylamino-1-methyl-1,3,2-azoxaphospholidine-2-oxide and octamethylpyrophosphoramide.

It is preferred that the other organo-Lewis Base compounds are the secondary and tertiary amines such as dibutylamine, triethylamine or tributylamine, diamines such as N,N,N',N'-tetramethylethylenediamine, organo-sulphur compounds such as diphenylsulphone, and compounds containing both nitrogen and phosphorus atoms such as hexamethylphosphoric triamide, ethyl-N,N,N',N'-tetramethylphosphorodiamidate, N,N,N',N',N''-pentamethyl-N''-β-dimethylaminoethylphosphoric triamide; 2-dimethylamino-1,3-dimethyl-1,3,2-diazaphospholidine-2-oxide and octamethylpyrophosphoramide.

In addition to, or instead of, the organo-Lewis Base compound which may be present as compound (3), the catalyst system can include a substituted or unsubstituted polyene (component (4)) and this may be an acyclic polyene such as 3-methylheptatriene(1,4,6) or a cyclic polyene such as cyclooctatriene, cyclooctatetraene or cycloheptatriene or a derivative of such polyenes such as the alkyl- or alkoxy-substituted polyenes; the tropylium salts or complexes or tropolone or tropone.

The proportions of the various catalyst components can be varied widely depending both on the materials used and the absolute concentrations of the components. However, in general for each gramme atom of the transition metal which is present in component (1) of the catalyst, there is present at least 0.05, and preferably at least 1.0 mole of component (2), but it may be desirable to use much greater quantities of component (2), for example as many as 50 moles or even more, for each gramme atom of the transition metal. In general we prefer to use not more than 25, and particularly not more than 15, moles of component (2) for each gramme atom of the transition metal. The amount of the organo-Lewis Base compound, which is the optional component (3), is in the range from 0.01 up to 10, preferably from 0.05 up to 5.0, and especially from 0.2 up to 2 moles for each gramme atom of the transition metal which is present in component (1) of the catalyst, and the amount, in moles, of component (3) is less than the amount, in moles, of component (2). The number of moles of any polyene which is present in the catalyst is preferably less than the number of moles of component (2) of the catalyst. For each mole of component (2), there are conveniently present from 0.01 up to 1.0, especially 0.05 up to 0.5, for example 0.2 mole of the polyene. If the catalyst includes both components (3) and (4) the number of moles of the organo-Lewis Base compound which is component (3) and the polyene should preferably, in total, be less than the number of moles of component (2) of the catalyst. If the catalyst includes both components (3) and (4), these can conveniently be used in equimolar proportions but the relative proportions of these components may be varied to give the optimum result.

The catalysts are useful in the polymerisation of olefine monomers and in particular can be used to polymerise propylene to give a polymer product having a low proportion of soluble polymer, particularly useful catalysts for this purpose being those in which component (2) is a dialkyl aluminium halide.

Thus, as a further aspect of the present invention there is provided a process for the production of a polymer or copolymer of an olefine monomer wherein at least one olefine monomer, or a mixture of at least one olefine monomer and ethylene, is contacted with a polymerisation catalyst comprising:

(1) a solid transition metal compound which is the product of mixing at least one compound of a transition metal of Groups IVA to VIA of the Periodic Table, with at least one organo-compound of aluminium or of a non-transition metal of Groups IA or IIA of the Periodic Table, to obtain a solid reaction product, and contacting the reaction product with at least one sulphur-containing organic compound of the formula (A), (B) or (C), in an amount of from 0.01 up to 2.00 mole of the sulphur-containing organic compound for each gramme atom of the transition metal which is present in the reaction product, the contacting being effected, at least partially, at a temperature in the range from 60° C. up to 160° C., wherein the formulae (A), (B) and (C) are all as hereinbefore specified; and (2) at least one organo-metallic compund of aluminium or of a non-transition metal of Group IIA of the Periodic Table, or a complex of an organo-metallic compound of a non-transition metal of Group IA or IIA of the Periodic Table and an organo-aluminium compound; and optionally (3) at least one organo-Lewis Base compound and/or (4) at least one substituted or unsubstituted polyene.

The monomer will be any olefine monomer, particularly mono-α-olefine monomer, which is capable of being polymerised using a Ziegler catalyst. Monomers which can be polymerised by the present process include butene-1 and 4-methylpentene-1 and particularly propylene. If it is desired to prepare copolymers, two or more of these olefines may be copolymerised together but we prefer to use ethylene as the comonomer, conveniently using a sequential polymerisation process such as is described in British Patent Specification Nos. 970 478, 970 479 and 1 014 944. Copolymers or propylene and ethylene which have been prepared using the catalyst of the present invention and a sequential polymerisation process possess a combination of toughness (for example a low temperature brittle point of about −50° C.) with stiffness (for example of flexural modulus greater than 1.00 $GN/m^2$) which is not achieved when a catalyst system is used in which the reaction product has not been treated with the sulphur compound.

The process of the present invention can be used for the polymerisation of propylene to give a high yield, relative to the amount of component (1) of the catalyst, of a polymer which contains a relatively low proportion of the undesirable soluble polymer.

By the process of the present invention there is typically obtained a polymeric product in the form of a free flowing powder.

It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when polymerising to obtain a high yield of polymer relative to component (1) of the catalyst, smaller proportions of the catalyst are used than are used in the conventional polymerisation processes, and accordingly the catalyst is more susceptible to any impurities present in the system. Thus, in order to obtain a high yield of polymer, it may be found desirable to subject the monomers, and any diluents, which are of commercial purity to a further purification procedure.

The purification treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Patent Specifications Nos. 1 111 493 and 1 226 659.

The polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system, a stirred bed system or a ribbon blender type of reactor.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, in a batch process, not all of the catalyst is added at the beginning of the polymerisation. Thus a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of a solid material may be inconvenient, it may be preferred that all of the transition metal compound is added, together with some of each of the other catalyst components, to initiate polymerisation and the rest of the other catalyst components are added during the polymerisation. It is desirable that, in any mixing of the catalyst components, component (1) is not allowed to come into contact with any organo-Lewis Base compound which is present as component (3) in the absence of the organo-metallic compound which is component (2) of the catalyst.

The polymerisation can be effected in the presence of a chain transfer agent such as hydrogen or a zinc dialkyl, in order to control the molecular weight of the product formed. If hydrogen is used as the chain transfer agent, it is conveniently used in an amount of from 0.01 up to 5.0%, particularly from 0.05 up to 2.0%, molar relative to the monomer. The amount of chain transfer agent will be dependent on the polymerisation conditions, especially the temperature which is typically in the range from 20° C. up to 100° C., preferably from 50° C. up to 80° C.

Using the polymerisation process of the present invention, we have been able to polymerise propylene to obtain a high yield, relative to the amount of component (1) used, of a polymer having a flexural modulus which in some cases may be as high as that of commercially available propylene polymers which have been obtained in a lower yield and from which a catalyst removal step is necessary.

Thus, when using a catalyst containing titanium trichloride, a propylene polymer can be obtained wherein the titanium content of the polymer derived from the residual catalyst in the polymer is not more than about 100 parts per million (ppm), by weight and the flexural modulus of the polymer is at least 1.00 $GN/m^2$.

The flexural modulus of the polymer is the modulus as measured by the apparatus described in Polymer Age, March 1970, pages 57 and 58 at 1% skin strain after 60 seconds at 23° C. and 50% relative humidity using test samples prepared as in Example 2.

The titanium content of the polymer may be determined by any suitable analytical technique and we have found X-ray fluorescence spectrometry to be a particularly convenient technique of analysis.

Using the process of the present invention, polymers, particularly propylene homopolymers, can be obtained which have a flexural modulus of at least 1.30 $GN/m^2$, or even 1.50 $GN/m^2$ or greater. Propylene copolymers may be obtained which have a low temperature brittle point in the range −40° C. to −50° C. and a flexural modulus of at least 1.00 $GN/m^2$ which may be as high as 1.15 $GN/m^2$. Alternatively, propylene copolymers may be obtained which have a low temperature brittle point in the range −20° C. to −30° C. and a flexural modulus of at least 1.30 $GN/m^2$, which may be as high as 1.40 $GN/m^2$.

Polymers obtained by the process of the present invention have a high molecular weight as indicated by the melt flow index measured according to ASTM Test Method D 1238-70, using Condition N (that is a temperature of 190° C. and a weight of 10 kg). Specifically, the polymers typically have a melt flow index of less than 200. It is preferred that the melt flow index is less than 100, particularly less than 50, for example between 5 and 50.

Various aspects of the present invention are described in the following Examples which are illustrative of the invention.

EXAMPLE 1

660 ml of a 33⅓% by volume solution of $TiCl_4$ in an aliphatic hydrocarbon diluent of boiling point 170° C. to 180° C. was placed in a 5 liter nitrogen-purged, dry, jacketted glass reaction vessel. The solution was cooled to 0° C. and stirred at 250 rpm. A 25% by weight solution of ethyl aluminium sesquichloride in the same hydrocarbon diluent was added, over a period of 8 hours, to the contents of the reaction vessel which were stirred and maintained at 0° C. Sufficient of the sesquichloride solution was added to provide 0.9 mole of diethyl aluminium chloride (and correspondingly 0.9 mole of ethyl aluminium dichloride) per mole of titanium tetrachloride.

At the end of the addition of the sesquichloride solution, the mixture was heated to 65° C. over 20 minutes and held at that temperature for a further two hours. Stirring was then stopped and the solid particles were allowed to settle. The supernatant liquor was decanted off, the solid was resuspended in approximately 3 liters of the hydrocarbon diluent, allowed to settle and the liquor again decanted off. The process of resuspending the solid and decanting off the liquor was repeated twice more. The solid was finally resuspended in the hydrocarbon diluent.

To the suspension of solid titanium trichloride was added, slowly, from a syringe, a 25% by weight solution of diethyl aluminium chloride in the hydrocarbon diluent in an amount of 0.25 mole of diethyl aluminium chloride for each gramme atom of titanium present as titanium trichloride in the solid. N.N-di-butyl-benzene sulphonamide was then added, also from a syringe, in an amount of 0.20 mole for each gramme atom of titanium present as titanium trichloride in the solid. The mixture was stirred and heated, over a period of 1.25 hours, up to a temperature of 110° C. and maintained at 110° C. for a time of 8 hours whilst stirring. Heating and stirring were then terminated and the mixture allowed to cool and the solid to settle.

EXAMPLE 2

Polymerisation was carried out in a 20 gallon (91 liter) stainless steel autoclave.

64 liters of the hydrocarbon diluent (as used in Example 1) were charged into the vessel, and degassed at 60° C. for 30 minutes at a pressure of 50 mm of mercury. Propylene containing 0.15% by volume of hydrogen, was then admitted to the vessel in an amount to give a pressure of 1 psi (7 $kN/m^2$) gauge. The diluent was stirred and stirring was continued throughout the following procedures. 0.536 mole of diethyl aluminium chloride, as a 25% by weight solution in the hydrocarbon diluent, were then added to the autoclave followed by 1 liter of the hydrocarbon diluent. 0.268 mole of titanium trichloride (prepared as described in Example 1) was added as a 0.5 mole/liter suspension of the titanium trichloride in the hydrocarbon diluent. Two liters of the hydrocarbon diluent were then added.

The autoclave was maintained at 60° C. whilst propylene was passed into the autoclave at a constant rate of 22 lbs/hour (about 10 kg/hour). The propylene charge contained 0.15% by volume of hydrogen. A total of 33.5 kg of propylene were passed into the autoclave, after which the propylene feed was terminated and the autoclave pressure was allowed to run down to 5 psig (35 $kN/M^2$) gauge. The residual propylene was vented off and the polymer suspension was passed into a glass-lined vessel. The autoclave was washed with 20 liters of diluent which was also added to the glass-lined vessel. The contents of the glass-lined vessel were mixed with isopropanol in an amount of 2% by volume relative to the diluent. The mixture was stirred for one hour at 70° C. and a mixture of isopropanol and water (containing 10% by volume of water) was added in an amount of 0.6% by volume relative to the diluent and stirring at 70° C. continued for a further two hours.

The polymer suspension was run into a further vessel containing 40 liters of demineralised water at ambient temperature, and the mixture was stirred for 30 minutes. The aqueous phase was then decanted off and a further 40 liters of demineralised water at ambient temperature were added and the process was repeated. The diluent was then filtered off and the polymer was dried at 100° C. in a fluidised bed using nitrogen as the fluidising gas.

The polymer obtained had the following characteristics.

The yield of soluble polymer is expressed as a percentage, by weight, of the propylene introduced into the polymerisation vessel.

% diluent soluble polymer—(a) 1.2% by weight
% residual soluble polymer—(b) 4.9% by weight
Packing density—(c) 488 g/l
MFI—(d) 8.5
Flexural modulus—(e) 1.36 $GN/m^2$ (a) Determined by taking an aliquot portion of the polymerisation diluent at the end of the polymerisation before adding the isopropanol.

(b) Determined by dissolving one gram of solid polymer in 50 ml of the hydrocarbon diluent by heating at 185° C. The solution is cooled to 60° C. and stirred at this temperature for 18 hours. The precipitated polymer is separated by filtration at 60° C., and the proportion of polymer which remains dissolved in the diluent at 60° C. is determined, by heating the solution to dryness.

(c) Determined by introducing 10 grams of the polymer powder into a 50 ml flat bottomed graduated tube of 2 cm internal diameter. The powder was compacted by striking the base of the tube against a horizontal surface a total of 30 times. The volume occupied by the polymer powder was then determined. Duplicate measurements were made.

(d) The melt flow index (MFI) was measured by ASTM Test Method D 1238-70, Condition N (190° C. and 10 kg).

(e) The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip, which had dimensions of approximately 150×19×1.6 mm, was prepared by mixing 23 g of the polymer with 0.1% by weight of an antioxidant ('Topanol' CA), and adding the mixture to a Brabender Plasticiser, at 190° C., 30 rpm and under a load of 10 kg to convert it to a crepe. The crepe was placed within a template, between aluminium foil and pressed by means of an electric Tangye press at a temperature of 250° C. The pressing was pre-heated for a period of six minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150×19×1.6 mm. Duplicate strips of each polymer were placed into an annealing oven at 130° C. and after 2 hours at this temperature the heat was switched off and the oven cooled to ambient temperature at 15° C. per hour.

The flexural modulus is dependent on the MFI of the polymer, and for each decade increase in MFI (for example from 3 up to 30), the flexural modulus will increase by an amount of approximately 0.18 $GN/m^2$.

EXAMPLES 3 TO 5

One liter of a 33⅓% by volume solution of $TiCl_4$ in the aliphatic hydrocarbon diluent used in Example 1 was placed in a nitrogen-purged, dry, stainless steel autoclave. The solution was cooled to 0° C. and stirred at 250 rpm. A 25% by weight solution of ethyl aluminium sesquichloride in the same hydrocarbon diluent was added over a period of 8 hours, to the contents of the autoclave which were stirred and maintained at 0° C. Sufficient of the sesquichloride solution was added to provide 0.9 mole of diethyl aluminium chloride (and correspondingly 0.9 mole of ethyl aluminium dichloride) per mole of titanium tetrachloride.

At the end of the addition of the sequichloride solution, the mixture was stirred at 0° C. for 2 hours, and then heated over a period of 1.5 to 2.0 hours to 110° C., whilst still stirring. The mixture was maintained with stirring, at 110° C., for 8 hours, stirring was then stopped and the solid particles were allowed to settle. The supernatant liquor was decanted off, the solid was resuspended in 3 liters of the hydrocarbon diluent, allowed to settle and the liquor again decanted off. The process of resuspending the solid and decanting off the liquor was repeated twice more. The solid was finally resuspended in the hydrocarbon diluent and the suspension of solid was removed.

To the washed titanium trichloride suspension was added 0.30 mole, for each gram atom of titanium, of an organo-Lewis Base compound. The mixture was then heated up to 120° C. over a period of 1.5 to 2.0 hours and this temperature was maintained for 7 hours. At the end of the heating period, the supernatant liquid was decanted off and the solid was washed (using the technique described in Example 1) three times with the hydrocarbon diluent at a temperature of 120° C. The solid was finally suspended in cold hydrocarbon diluent. Further details are set out in Table 1.

TABLE 1

| Example | Organo-Lewis Base Compound (f) | Comments |
|---|---|---|
| 3 | EBSA | Final suspension had slightly milky supernatant. |
| 4 | PT | PT added as a solid. |
| 5 | DPS | Final suspension had |

TABLE 1-continued

| Example | Organo-Lewis Base Compound (f) | Comments |
|---|---|---|
| | | slightly milky supernatant. |

Notes to Table 1
(f) EBSA is N,N-diethylbenzenesulphonamide.
PT is phenoxathiin.
DPS is diphenylsulphone.

EXAMPLES 6 TO 8

The polymerisation process of Example 2 was repeated using the products of Examples 3 to 5. The results are given in Table 2, together with the result of a comparative experiment in which the reaction product used had been heated to 120° C. for 7 hours in the absence of the organo-Lewis Base compound.

TABLE 2

| Example or Comparative Example | Form of $TiCl_3$ (g) | Yield of Soluble Polymer (% by wt) Diluent (a) | Yield of Soluble Polymer (% by wt) Residual (b) | Packing Density (g/l) (c) | MFI (d) | Flexural Modulus ($GN/m^2$) (e) |
|---|---|---|---|---|---|---|
| 6 | 3 | 3.2 | 1.3 | 526 | 5.3 | 1.50 |
| 7 | 4 | 2.3 | 1.3 | 507 | 15 | 1.52 |
| 8 | 5 | 3.7 | 1.7 | 526 | 10.5 | 1.46 |
| A | A | 3.3 | 1.8 | 500 | 19 | 1.41 |

Notes to Table 2
(a) to (e) are as defined in Example 2.
(g) A is a reaction product obtained as in Example 3 except that the heating at 120° C. is effected in the absence of the organo-Lewis Base compound.

EXAMPLES 9 AND 10

The titanium trichloride material prepared in Examples 1 and 4 was used to polymerise propylene in the gas phase. Polymerisation was carried out in a steel autoclave of capacity 8 liters fitted with an anchor stirrer/scraper. 400 g of dry polypropylene was added while stirring the autoclave at 70° C. The stirrer speed was 150 rpm. The autoclave was evacuated, after half an hour the vacuum was released with propylene, and then the autoclave was re-evacuated. This procedure was repeated a further five times over an hour and a half to leave an atmosphere of propylene. The stirrer was stopped and 25 millimoles of diethyl aluminium chloride in heptane were added. The autoclave contents were stirred for a minute, the stirrer was stopped, and 2 millimoles of the titanium trichloride material were added. The stirrer was restarted and propylene gas was then admitted to the top of the autoclave from a heated stock vessel containing liquid propylene. A pressure of 400 psi (2760 $kN/m^2$) gauge was established over a period of about 30 minutes. The temperature was maintained at 70° C. throughout. Hydrogen was added evenly during the pressurisation stage at a rate of 20 millimoles per 100 psi (690 $kN/m^2$) gauge pressure rise. Polymerisation was effected at 400 psi (2760 $kN/m^2$) gauge and 70° C., and hydrogen was added in aliquots of 10 millimoles for every 80 g of liquid propylene evaporated into the autoclave from the stock vessel. After 4 hours polymerisation the propylene supply was turned off and the autoclave vented to atmospheric pressure. The gas cap was purged with nitrogen and the polymer emptied out. The polymer obtained was a free flowing pinkish powder. The polymer initially present in the reactor had the following characteristics:

Ti content—27 ppm
MFI—29
Flexural Modulus—1.40 GN/m$^2$

Further details, and the results obtained, are set out in Table 3.

TABLE 3

| Example | Form of TiCl$_3$ | Yield of Solid Polymer (g/mM) (h) | Found Ti (ppm by wt) (j) | MFI (d) | Nett Residual Soluble Polymer (wt %) (b) (k) | Flexural Modulus GN/m$^2$ (e) |
|---|---|---|---|---|---|---|
| 9 | 1 | 482 | 88 | 11.5 | 7.3 | 1.24 |
| 10 | 4 | 520 | 76 | 24 | 6.0 | 1.39 |

Notes to Table 3
(b), (d) and (e) are as defined in Example 2.
(h) Based on solid polymer formed relative to the TiCl$_3$ present in the catalyst as determined by ceric sulphate titration.
(j) The nett Ti content in the polymer formed, as determined by X-ray fluorescence spectrometry, with allowance made for Ti content of initial polymer.
(k) Makes no allowance for the proportion of soluble polymer present in the initial polymer.

EXAMPLES 11 TO 13

A titanium trichloride product was prepared as described in Example 1, except that the temperature of 65° C. was maintained for three hours and, after the product had been washed, it was split into fractions, each of which was treated, in a different manner, with N,N-dibutylbenzenesulphonamide. The titanium trichloride product was heated at 120° C. for 8 hours, the N,N-dibutylbenzenesulphonamide being added to the titanium trichloride at different stages during the heating.

After the heat treatment at 120° C., the products were washed three times with the hydrocarbon diluent as described in Example 1 and then the materials were given a final wash in toluene. Details of the preparation are given in Table 4.

TABLE 4

| Example No. | Quantity of BBSA (M/g atom Ti) | Time of Adding BBSA | Comments |
|---|---|---|---|
| 11 | 1 | On Reaching 120° C. | Smooth particles of 20-25 μ diameter |
| 12 | 1 | After 2 hours at 120° C. | Smooth particles of 20-25 μ diameter |
| 13 | 0.5 | After 4 hours at 120° C. | Smooth particles of 20-25 μ diameter |

EXAMPLES 14 TO 16

The polymerisation process of Example 2 was repeated using the products of Examples 11 to 13. The results are given in Table 5.

TABLE 5

| Example | Form of TiCl$_3$ (a) | Yield of Soluble Polymer (% by wt) Diluent (b) | Residual (b) | Packing Density (g/l) (c) | MFI (d) | Flexural Modulus (GN/m$^2$) (e) |
|---|---|---|---|---|---|---|
| 14 | 11 | 4.1 | 1.6 | 500 | 3.8 | 1.41 |
| 15 | 12 | 5.7 | 1.5 | 500 | 5 | 1.43 |
| 16 | 13 | 2.6 | 3.9 | 500 | 2.8 | 1.38 |

Notes to Table 5
(a) to (e) are as defined in Example 2.

EXAMPLES 17 TO 21

The procedure of Example 4 was repeated using different proportions of phenoxathiin and maintaining the temperature of 120° C. for 8 hours.

Further details are given in Table 6.

TABLE 6

| Example | Amount of phenoxathiin (mole/g atom of Ti) |
|---|---|
| 17 | 0.05 |
| 18 | 0.10 |
| 19 | 0.20 |
| 20 | 0.30 |
| 21 | 0.40 |

EXAMPLES 22 TO 26

The polymerisation procedure of Example 2 was repeated using the products of Examples 17 to 21. The results obtained are set out in Table 7, together with the results obtained using forms of titanium trichloride which had not been heated to 120° C. in the presence of phenoxathiin.

TABLE 7

| Example or Comparative Example | Form of TiCl$_3$ (1) | Yield of Soluble Polymer (% by wt) Diluent (a) | Residual (b) | Packing Density (g/l) (c) | MFI (d) | Flexural Modulus GN/m$^2$ (e) | Activity (g/mM hr. at.) (m) |
|---|---|---|---|---|---|---|---|
| 22 | 17 | 3.5 | 1.4 | 471 | 20 | 1.49 | 5.4 |
| 23 | 18 | 3.5 | 1.7 | 488 | 27 | 1.49 | 5.7 |
| 24 | 19 | 3.4 | 1.4 | 476 | 28.5 | 1.62 | 6.4 |
| 25 | 20 | 3.1 | 1.5 | 494 | 12.5 | 1.47 | 6.0 |
| 26 | 21 | 2.5 | 1.5 | 482 | 22.5 | 1.60 | 7.1 |
| B | B | 3.4 | 4.8 | 476 | 19 | 1.34 | 6.5 |
| C* | B | 3.5 | 3.9 | 476 | 21 | 1.34 | 6.3 |
| D | C | 3.3 | 2.8 | 476 | 25 | 1.39 | 5.0 |

Notes to Table 7
(a) to (e) are as defined in Example 2.
(1) B is a form of TiCl$_3$ obtained as described but omitting the final heat treatment at 120° C. in the presence of phenoxathiin. C is a form of TiCl$_3$ obtained as described but omitting phenoxathin from the heat treatment at 120° C.
(m) Calculated from the weight of monomer fed per millimoles of TiCl$_3$ in the catalyst during the final hour of the polymerisation for each atmosphere pressure of propylene. The propylene pressure is determined by correcting the total pressure for the presence of inert materials such as nitrogen and propane which are determined by titrating the gas space at the end of the polymerisation with bromine water.
*In this run, phenoxathiin was present as a separate catalyst component in an amount of 0.30 mole for each gramme atom of titanium present in the titanium trichloride material. The catalyst components were introduced into the polymerisation autoclave in the order:-diethyl aluminium chloride, phenoxathiin and then titanium trichloride material.

EXAMPLES 27 TO 36

The reaction between TiCl$_4$ and ethyl aluminium sesquichloride was repeated as described in Examples 3 to 5. After holding at 0° C. for two hours, the solid reaction product obtained was heated up to a temperature as defined in Table 8 then, once the specified temperature was attained, stirring was stopped, the solid was allowed to settle and the supernatant liquor was decanted off.

The solid was then washed five times at ambient temperature each wash consisting of suspending the solid in 3 liters of the hydrocarbon diluent, allowing the solid to settle and decanting off the supernatant liquor. The solid was finally resuspended in the hydrocarbon diluent.

The washed titanium trichloride suspension was then heated, whilst stirring, up to a temperature as defined in Table 8 and 0.40 mole, for each gram atom of titanium, of phenoxathiin was added once the desired temperature had been attained, and the mixture was maintained at the temperature for four hours. At the end of this heating period, the solid was allowed to settle, the supernatant liquor was decanted off and, whilst still heating at the same rate, the solid was washed three times by the addition of the hydrocarbon diluent.

Each of the products thus obtained was divided into two equal portions. One of the portions was given no further treatment. The other portion was heated, whilst stirring, up to a temperature was defined in Table 8 and maintained at the temperature for four hours.

The details of the treatments are given in Table 8.

TABLE 8

| Example | Heat treatment temperature (°C.) | | |
|---|---|---|---|
| No. | First | Second | Third(n) |
| 27 | 65 | 65 | NIL |
| 28 | 80 | 80 | NIL |
| 29 | 100 | 100 | NIL |
| 30 | 110 | 110 | NIL |
| 31 | 130 | 130 | NIL |
| 32 | 65 | 65 | 65 |
| 33 | 80 | 80 | 80 |
| 34 | 100 | 100 | 100 |
| 35 | 110 | 110 | 110 |
| 36 | 130 | 130 | 130 |

Notes to Table 8
(n)NIL - these material were subjected to only two heat treatments.

EXAMPLES 37 TO 46

The polymerisation process of Example 2 was repeated using the products of Examples 27 to 36. The results are given in Table 9.

TABLE 9

| Example | Form of TiCl$_3$ | Yield of Soluble Polymer (% by weight) | | Flexural Modulus (GN/m$^2$) | Activity (g/mM hr at.) |
|---|---|---|---|---|---|
| | | Diluent (a) | Residual (b) | (e) | (m) |
| 37 | 27 | 16.6 | 8.1 | 1.10 | 4.7 |
| 38 | 28 | 7.5 | 5.3 | 1.22 | 7.4 |
| 39 | 29 | 4.2 | 3.4 | 1.44 | 7.7 |
| 40 | 30 | 3.6 | 2.3 | 1.48 | 7.9 |
| 41 | 31 | 3.4 | 1.4 | 1.57 | 6.2 |
| 42 | 32 | 13.9 | 7.5 | 1.15 | 5.7 |
| 43 | 33 | 7.4 | 4.3 | 1.29 | 6.5 |
| 44 | 34 | 4.1 | 1.9 | 1.44 | 7.4 |
| 45 | 35 | 3.8 | 1.9 | 1.50 | 7.7 |

TABLE 9-continued

| Example | Form of TiCl$_3$ | Yield of Soluble Polymer (% by weight) | | Flexural Modulus (GN/m$^2$) | Activity (g/mM hr at.) |
|---|---|---|---|---|---|
| | | Diluent (a) | Residual (b) | (e) | (m) |
| 46 | 36 | 3.6 | 0.9 | 1.52 | 4.8 |

Notes to Table 9
(a), (b) (e) are as defined in Example 2
(m) is as defined in Notes to Table 7.

EXAMPLE 47

The procedure of Examples 3 to 5 was repeated except that 0.40 mole of phenoxathiin were used and the mixture of the reaction product and phenoxathiin was heated to 130° C. for 8 hours.

EXAMPLES 48 AND 49

The titanium trichloride product of Example 47 was used to repeat the polymerisation process of Example 2. Polymerisation was effected at 60° C., and also at 70° C.

The results obtained are set out in Table 10.

TABLE 10

| Example or Comparative Example (p) | Polym Temp. (°C.) | Yield of Soluble Polymer (% by wt) | | Packing Density (g/l) | MFI | Flexural Modulus (GN/m$^2$) |
|---|---|---|---|---|---|---|
| | | Diluent (a) | Residual (b) | (c) | (d) | (e) |
| 48 | 60 | 2.3 | 1.5 | 455 | 19.8 | 1.65 |
| 49 | 70 | 3.0 | 1.6 | 482 | 27.6 | 1.60 |
| E | 60 | 4.1 | 4.1 | 476 | 18.4 | 1.41 |
| F | 70 | 4.3 | 5.0 | 455 | 26.9 | 1.27 |

Notes to Table 10
(a) to (e) are as defined in Example 2
(p) In the Comparative Examples the titanium trichloride material was obtained as described but omitting the final heat treatment at 130° C. in the presence of phenoxathiin.

EXAMPLE 50

The titanium trichloride product of Example 47 was used to prepare a copolymer of propylene with ethylene.

Polymerisation was effected in a 20 gallon (91 l) stainless steel autoclave. 64 liters of the hydrocarbon diluent (as used in Example 1) were charged into the vessel and degassed at 60° C. for 30 minutes at a pressure of 50 mm Hg. Propylene containing 0.175% by volume of hydrogen was then admitted to the vessel at a rate of 22 lbs/hr in an amount to give a pressure of 1 psi (7 kN/m$^2$) gauge. A vent on the vessel was opened and the propylene/hydrogen addition was continued for a further 5 minutes, the pressure in the autoclave being maintained at 1 psig throughout. The vent was then closed and the addition of the propylene/hydrogen mixture stopped. The contents of the vessel were stirred throughout the following procedures. 0.536 mole of diethyl aluminium chloride, as a 25% by weight solution in the hydrocarbon diluent, were added to the autoclave, followed by 1 liter of the hydrocarbon diluent. 0.268 mole of the titanium trichloride product of Example 47 was added as a 0.7 mole/liter suspension of the titanium trichloride in the hydrocarbon diluent. This was washed in with a further 1 liter of hydrocarbon diluent.

The autoclave temperature was maintained at 60° C. whilst a total of 60.3 lbs (27.4 kg) of propylene containing 0.175 volume % of hydrogen was passed into the autoclave at a constant rate of 22 lbs/hour (about 10 kg/hour), after which the propylene/hydrogen feed was terminated and the autoclave pressure was allowed to run down to 10 psi gauge, (equivalent to 20 psi absolute) of propylene, the excess pressure being due to the presence of inert materials. A total of 2.07 kg of ethylene was then metered into the autoclave at a feed rate of 2.3 kg/hour for 20 minutes, then 4.0 kgm/hour for 20 minutes. The ethylene feed was then terminated and the autoclave pressure allowed to run down to a total pressure of 2 psi gauge.

The polymer suspension was passed into a 20 gallon (91 l) glass-lined vessel. The autoclave was washed with 20 liters of the hydrocarbon diluent which was also added to the glass-lined vessel. The contents of the glass-lined vessel were mixed with isopropanol in an amount of 3% by volume relative to the diluent. The mixture was stirred for ½ hour at 70° C., and a mixture of isopropanol and distilled water (containing 10% by volume of water) was added in an amount of 0.6% by volume relative to the diluent and stirring at 70° C. continued for a further 1½ hours.

The polymer suspension was run into a further 20 gallon vessel containing 40 liters of demineralised water at ambient temperature and the mixture was stirred for 30 minutes. The stirrer was then stopped and the aqueous phase decanted off. A further 40 liters of demineralised water was added, stirring restarted and the process repeated. The diluent was then filtered off and the polymer was dried at 100° C. in a fluidised bed using nitrogen as the fluidising gas.

The polymers obtained had the properties set out in Table 11.

(equivalent to 30 psi absolute of propylene). A total of 4.4 kg of ethylene was then added at a feed rate of 2.3 kg/hour for 20 minutes and then 4.0 kg/hour for 56 minutes. Ethylene feed was terminated and the autoclave pressure allowed to run down to 2 psig. The polymer suspension was then treated as described in the previous Example.

The polymers obtained had the properties set out in Table 12.

TABLE 12

| Example or Comparative Example (p) | Ethylene Content (% by wt) | Yield of Soluble Polymer (% weight) | | Packing Density (g/l) (c) | MFI (d) | Flexural Modulus (GN/m$^2$) (e) | Low Temp. Brittle Point (°C.) (q) |
|---|---|---|---|---|---|---|---|
| | | Diluent (a) | Residual (b) | | | | |
| 51 | 11.2 | 4.0 | 8.4 | 497 | 9.4 | 1.08 | −45 |
| H | 11.7 | 5.8 | 8.1 | 526 | 8.6 | 0.93 | −43 |

Notes to Table 12
(a) to (e) are as defined in Example 2.
(p) is as defined in Notes to Table 10.
(q) is as defined in Notes to Table 11.

EXAMPLE 52

64 liters of the hydrocarbon diluent were charged into a 20 gallon (91 liter) stainless steel autoclave and degassed at 60° C. for 30 minutes at a pressure of 50 mm of mercury. The autoclave was then cooled to room temperature and the vacuum let down with nitrogen sufficient to give an autoclave pressure of 1 psig (7 kN/m$^2$) gauge. The diluent was stirred and stirring was continued throughout the following procedures. 0.536 mole of diethyl aluminium chloride, as a 25% by weight solution in the hydrocarbon diluent, were added followed by 1 liter of the hydrocarbon diluent. 0.268 mole of titanium trichloride product of Example 47 was added as a 0.7 mole/liter suspension of the titanium trichloride in the hydrocarbon diluent. The contents of the autoclave were then stirred at ambient temperature for 2 hours. The mixture was then heated to 60° C. and degassed for a further 30 minutes at a pressure of 50 mm of mercury. The vacuum was then released by admitting propylene containing 0.14% by volume of hydrogen to the autoclave at a constant feed rate of 22 lbs/hour (approximately 10 kg/hour). A total of 54.5 lbs (24.8 kgm) of the propylene/hydrogen mixture was

TABLE 11

| Example or Comparative Example (p) | Ethylene Content (% by wt) | Yield of Soluble Polymer (% weight) | | Packing Density (g/l) (c) | MFI (d) | Flexural Modulus (GN/m$^2$) (e) | Low Temp. Brittle Point (°C.) (q) |
|---|---|---|---|---|---|---|---|
| | | Diluent (a) | Residual (b) | | | | |
| 50 | 5.6 | 4.0 | 5.9 | 476 | 20.4 | 1.34 | −22 |
| G | 4.6 | 4.5 | 6.9 | 503 | 19.9 | 1.13 | −20 |

Notes to Table 11
(a) to (e) are as defined in Example 2.
(p) is as defined in Notes to Table 10.
(q) The low temperature brittle point was determined using the technique of ASTM Test Method D 746 modified by using specimens and specimen holder as in ASTM Bulletin No. 231, July 1958. The specimens were cut from a plaque prepared in the same manner as that from which were cut the test strips used in the flexural modulus test (Note (e) of Example 2).

EXAMPLE 51

The procedure of Example 50 was repeated except that a total of 55.3 lbs (25.1 kg) of propylene containing 0.145% by volume of hydrogen was added to the autoclave, after which the feed was terminated and the autoclave pressure allowed to run down to 18 psig added, this quantity being measured from the time the autoclave reached 0 psi gauge. The propylene/hydrogen feed was then terminated and the autoclave pressure allowed to run down to 21 psig (equivalent to a propylene pressure of 16 psi absolute). During the run down period the autoclave temperature was reduced from 60° C. to 50° C. A mixed feed of propylene (containing no hydrogen) and ethylene was then admitted to the autoclave, the respective quantities being 2.4 kg propylene and 3.0 kg ethylene, added over 1 hour 19 minutes. The feed was then terminated and immediately the polymer suspension was run into a 20 gallon glass-lined vessel. The autoclave was washed with 20 liters of the hydrocarbon diluent, which was also passed to the glass-lined vessel. The contents of the glass-lined vessel were mixed with isopropanol in an amount of 3% by volume relative to the diluent. The mixture was stirred for 1 hour at 55° C. and a mixture of isopropanol and distilled water (containing 10% by volume of water) was added in an amount of 0.6% by volume relative to the diluent. Stirring at 55° C. was continued for a further 2 hours.

The polymer suspension was run into a further vessel containing 40 l demineralised water and washed with water as described in Example 50. The diluent was then filtered off and the polymer dried at 75° C. in a fluidised bed using nitrogen.

The polymers obtained had the properties set out in Table 13.

TABLE 13

| Example or Comparative Example (p) | Ethylene Content (% by wt) | Yield of Soluble Polymer (% weight) | | Packing Density (g/l) (c) | MFI (d) | Flexural Modulus (GN/m$^2$) (e) | Low Temp. Brittle Point (°C.) (q) |
|---|---|---|---|---|---|---|---|
| | | Diluent (a) | Residual (b) | | | | |
| 52 | 8.2 | 3.8 | 15.9 | 497 | 6.6 | 1.06 | −48 |
| K | 6.6 | 11.1 | 16.5 | 404 | 6.1 | 0.98 | −47 |

Notes to Table 13
(a) to (e) are as defined in Example 2.
(p) is as defined in Notes to Table 10.
(q) is as defined in Notes to Table 11.

EXAMPLE 53

A copolymerisation process was carried out continuously in a series of 5 interconnected 5 gallon stainless steel autoclaves wherein the transfer lines between each adjacent pair of vessels were provided with isolation valves.

Into each of the second, third, fourth and fifth autoclaves was placed a sample of a live polymer suspension (that is one in which there had been no treatment to deactivate the catalyst) which had been prepared by a technique as described in Example 2 but omitting the treatment with isopropanol, and subsequent treatments. The contents of these vessels were stirred, the vessels were maintained at 60° C. and the isolation valves were kept closed.

A separate homopolymerisation was effected in the first vessel at 60° C. by adding propylene gas containing 0.22% by volume of hydrogen, at a rate sufficient to maintain the autoclave pressure at 35 psig, into 15 liters of stirred, degassed hydrocarbon diluent containing 0.12 Moles diethyl aluminium chloride and 0.06 Moles of titanium trichloride (of the type used for Comparative Example G in Table 11).

When a polymer concentration of 200 g of polymer per liter of diluent had been attained in the first autoclave, continuous polymerisation was initiated by opening the isolation valves in the transfer lines between each pair of autoclaves. The feeds to the vessels were as follows:

First vessel—7 liters per hour of the hydrocarbon diluent; 2 liters per hour of a catalyst mixture containing 0.018 moles of titanium trichloride per liter of diluent and 0.036 moles of diethyl aluminium chloride per liter of diluent; and sufficient of the propylene/0.22% by volume of hydrogen mixture to maintain a pressure of 35 psig in this vessel.

Second vessel—The propylene/hydrogen mixture was also added to this vessel. The relative rates of feed of the propylene/hydrogen mixture to the first and second vessels were controlled in dependence on the liquid level of the suspension in each vessel to maintain the levels in each vessel at between 22 and 25 liters of suspension.

Third and Fourth vessels—No additions were made to these vessels, other than the polymer suspensions transferred from the preceding vessel in the series.

Fifth vessel—Ethylene and the propylene/hydrogen mixture were separately fed into this vessel. The amount of ethylene was continuously monitored and controlled to be 6.87% by weight of the total monomer being fed to the whole system. The amount of the propylene/hydrogen mixture was also controlled such that the molar ratio of propylene to ethylene polymerised within the fifth vessel was 0.55:1.

The suspension of copolymer formed in the fifth vessel was passed from this vessel into a continuous cascade deashing system, which provided a similar treatment to that described in Example 2. The rate of removal of the copolymer suspension from the fifth vessel was controlled to maintain equilibrium levels within the system.

Polymerisation was effected continuously for 28 hours using a titanium trichloride material of the type used for Comparative Example G in Table 11 and then a further 40 hours using the titanium trichloride product of Example 47.

The characteristics of the polymers obtained are set out in Table 14.

TABLE 14

| Example or Comparative Example (p) | Ethylene Content (% by wt) | Yield of Soluble Polymer (% weight) | | Packing Density (g/l) (c) | MFI (d) | Flexural Modulus (GN/m$^2$) (e) | Low Temp. Brittle Point (°C.) (q) |
|---|---|---|---|---|---|---|---|
| | | Diluent (a) | Residual (b) | | | | |
| 53 | 5.0 | 4.2 | 7.5 | 500 | 15 | 1.33 | −23 |

TABLE 14-continued

| Example or Comparative Example (p) | Ethylene Content (% by wt) | Yield of Soluble Polymer (% weight) | | Packing Density (g/l) (c) | MFI (d) | Flexural Modulus (GN/m$^2$) (e) | Low Temp. Brittle Point (°C.) (q) |
|---|---|---|---|---|---|---|---|
| | | Diluent (a) | Residual (b) | | | | |
| L | 6.2 | 5.4 | 8.9 | 520 | 20 | 1.18 | −15 |

Notes to Table 14
(a) to (e) are as defined in Example 2.
(p) is as defined in Notes to Table 10.
(q) is as defined in Notes to Table 11.

EXAMPLES 54 TO 58

The procedure of Example 4 was repeated with the following exceptions. After holding at 0° C. for two hours, the reaction product was heated up to 120° C. and, once the temperature reached 120° C. the solid was allowed to settle, the supernatant liquor decanted off and the solid was washed three times and finally suspended in the hydrocarbon diluent.

The suspension was heated to an elevated temperature (120° C. or 130° C.) and various proportions of phenoxathiin were then added to the heated suspension and the mixture was maintained at the elevated temperature for 8 hours. Further details of the treatment of the titanium trichloride products are given in Table 15.

EXAMPLES 59 TO 63

The products of Examples 54 to 58 were used to polymerise propylene using the technique of Example 2. The polymerisation results are also set out in Table 15.

to 5. After holding at 0° C. for two hours, samples of the reaction product were then heated up to 120° C. and maintained at that temperature for 8 hours. 0.40 mole, for each gram atom of titanium, of phenoxathiin was added to the heated mixture at a time as indicated in Table 16. After 8 hours, the solid was allowed to settle, the supernatant liquor was decanted off and the solid was washed three times with the hydrocarbon diluent and finally suspended in the hydrocarbon diluent.

A further sample of the reaction product was washed three times with the hydrocarbon diluent before being heated up to 120° C., the procedure otherwise being as described for the first samples.

Further details of the treatment of the titanium trichloride products are set out in Table 16 together with details regarding titanium trichloride products heated in the absence of phenoxathiin (Comparative Examples M and N).

EXAMPLES 68 TO 71

The products of Examples 64 to 67 and Comparative

TABLE 15

| Treatment of titanium trichloride | | Polymerisation results | | | | | |
|---|---|---|---|---|---|---|---|
| Example | Amount of PT (mole/g atom of Ti) (f) | Heat Treatment temp. (°C.) | Example | Yield of Soluble Polymer (% weight) | | Packing Density (g/l) (c) | MFI (d) | Flexural Modulus (GN/m$^2$) (e) |
| | | | | Diluent (a) | Residual (b) | | | |
| 54 | 0.40 | 120 | 59 | 2.8 | 2.8 | 449 | 21.1 | 1.54 |
| 55 | 0.60 | 120 | 60 | 2.6 | 1.4 | 440 | 13.2 | 1.55 |
| 56 | 0.80 | 120 | 61 | 2.7 | 1.1 | 438 | 23.0 | 1.60 |
| 57 | 1.00 | 120 | 62 | 2.5 | 0.9 | 435 | 19.0 | 1.50 |
| 58 | 1.00 | 130 | 63 | 2.5 | 1.2 | 463 | 17.5 | 1.57 |

Notes to Table 15
(a) to (e) are as defined in Example 2.
(f) is as defined in Notes to Table 1.

EXAMPLES 64 TO 67

The reaction between TiCl$_4$ and ethyl aluminium sesquichloride was repeated as described in Examples 3

Examples M and N were then used to polymerise propylene using the technique of Example 2. The polymerisation results are set out in Table 16.

TABLE 16

| Treatment of titanium trichloride | | | Polymerisation results | | | | | | |
|---|---|---|---|---|---|---|---|---|---|
| Example or Comparative Example (r) | Washed or Unwashed (s) | Time of PT Addn (hours) (t) | Example or Comparative Example | Yield of Soluble Polymer (% weight) | | Packing Density (g/l) (c) | MFI (d) | Flexural Modulus (GN/m$^2$) (e) | Activity (g/mM hr. at.) (m) |
| | | | | Diluent (a) | Residual (b) | | | | |
| 64 | U | NIL | 68 | 3.0 | 1.6 | 455 | 6.9 | 1.53 | 2.4 |
| 65 | U | 2 | 69 | 3.0 | 1.5 | 466 | 10.0 | 1.56 | 3.1 |
| 66 | U | 4 | 70 | 2.8 | 1.2 | 476 | 13.0 | 1.55 | 3.7 |
| 67 | W* | NIL | 71 | 2.6 | 1.0 | 500 | 15.6 | 1.54 | 6.6 |
| M | U | NONE | P | 2.9 | 3.2 | 488 | 15.1 | 1.46 | 5.5 |

TABLE 16-continued

| Treatment of titanium trichloride | | | Polymerisation results | | | | | | |
|---|---|---|---|---|---|---|---|---|---|
| Example or Comparative Example (r) | Washed or Unwashed (s) | Time of PT Addn (hours) (t) | Example or Comparative Example | Yield of Soluble Polymer (% weight) | | Packing Density (g/l) (c) | MFI (d) | Flexural Modulus (GN/m²) (e) | Activity (g/mM hr. at.) (m) |
| | | | | Diluent (a) | Residual (b) | | | | |
| N | W | NONE | Q | 4.0 | 1.9 | 466 | 14.0 | 1.44 | 5.0 |

Notes to Table 16
(a) to (e) are as defined in Example 2.
(m) is as defined in Notes to Table 7.
(r) In the Comparative Examples, the titanium tri-chloride product was heat treated in the absence of phenoxathiin.
(s) U indicates that the reaction product was not washed before being heated to 120° C.,
W indicates that the reaction product was washed (three times by decantation) before being heated to 120° C.,
W* indicates that the reaction product was not washed before being heated to 120° C. but on attaining 120° C., the solid was allowed to settle, the supernatant liquor was decanted off and, whilst still heating at the same rate, the solid was then washed three times with the hydrocarbon diluent which was at ambient temperature. The washed reaction product was then reheated to 120° C. and then the phenoxathiin was added.
(t) The time is measured from the time 120° C. is attained. NIL indicated that the phenoxathiin was added when the temperature of 120° C. was attained. NONE indicates that no phenoxathiin was added.

EXAMPLES 72 AND 73

Two samples of titanium trichloride were prepared using the procedure as described in Examples 3 to 5 with the following exceptions: the temperature at the start of the sesquichloride addition was −10° C. and increased steadily during the period of sesquichloride addition attaining −3° C. at the end of the addition, after holding at 0° C. for two hours, the reaction product was heated at 115° C. for 8 hours, and after washing the heated reaction product, 0.40 mole for each gramme atom of titanium, of phenoxathiin (Example 72) or thianthrene (Example 73) was added and the mixture was maintained at 120° C. for 8 hours.

EXAMPLES 74 AND 75

The products of Examples 72 and 73 were used to polymerise propylene using the procedure of Example 2. Further details regarding the characteristics of the polymers obtained are given in Table 17.

TABLE 17

| Example | Form of TiCl₃ | Yield of Soluble Polymer (% by weight) | | Flexural Modulus (GN/m²) (e) |
|---|---|---|---|---|
| | | Diluent (a) | Residual (b) | |
| 74 | 72 | 2.5 | 0.7 | 1.58 |
| 75 | 73 | 2.8 | 1.0 | 1.52 |

Notes to Table 17
(a), (b) and (e) are as defined in Example 2.

EXAMPLES 76 TO 79

The reaction between TiCl₄ and ethyl aluminium sesquichloride was repeated as described in Examples 3 to 5. After the holding period of two hours at 0° C., the reaction mixture was heated to a temperature of 120° C. over a period of 1.5 hours. Once the temperature of 120° C. was attained, stirring was stopped, the solid allowed to settle and the supernatant liquor was decanted off.

The solid was then washed twice with the hydrocarbon diluent by suspending the solid in the diluent, allowing the solid to settle and decanting off the supernatant liquor. The solid was finally resuspended in the hydrocarbon diluent.

The suspension of the washed titanium trichloride was heated up to 130° C., 0.40 mole, for each gramme atom of titanium, of a sulphur compound was added and the mixture was maintained at 130° C. for 4 hours. At the end of this heating period, the solid was allowed to settle, the supernatant liquor was decanted off and, whilst still heating at the same rate, the solid was washed twice by the addition of the hydrocarbon diluent. The solid was finally suspended in the hydrocarbon diluent. Further details of the treatment of the titanium trichloride are given in Table 18.

EXAMPLES 80 TO 83

The products of Examples 76 to 79 were used to polymerise propylene using the technique of Example 2. The polymerisation results are also set out in Table 18.

EXAMPLE 84

1440 ml of a 0.8 M solution of aluminum triethyl in iso-octane, containing a total of 1.15 moles of aluminium triethyl, were placed in a 5 liter, 3-necked flask. The flask was cooled to −70° C. in a bath of a mixture of acetone/solid carbon dioxide. The contents of the flask were stirred at 400 rpm and a solution of 3 moles of titanium tetrachloride in 1170 ml of iso-octane was added dropwise to the contents of the flask over a per-

TABLE 18

| Treatment of TiCl₃ | | Polymerisation results | | | | | |
|---|---|---|---|---|---|---|---|
| Example or Comparative Example | Sulphur Compound (f) (u) | Example or Comparative Example | Yield of Soluble Polymer (% weight) | | Packing Density (g/l) (c) | MFI (d) | Flexural Modulus (GN/m²) (l) |
| | | | Diluent (a) | Residual (b) | | | |
| 76 | PT | 80 | 2.5 | 1.5 | 485 | 19.0 | 1.59 |
| 77 | 2,8DMPT | 81 | 1.8 | 3.3 | 519 | 13.3 | 1.44 |
| 78 | 3,7DMPT | 82 | 2.1 | 3.2 | 506 | 12.6 | 1.50 |
| 79 | 3MPT | 83 | 2.7 | 2.2 | 471 | 23.5 | 1.57 |
| R | NIL | S | 4.3 | 2.1 | 466 | 20.6 | 1.57 |

Notes to Table 18
(a) to (e) are as defined in Example 2.
(f) PT is phenoxathiin
(u) 2,8DMPT is 2,8-dimethylphenoxathiin 3,7DMPT is 3,7-dimethylphenoxathiin 3MPT is 3-methylphenoxathiin.

iod of 4 hours, whilst maintaining the temperature at −70° C. and still stirring. At the end of the addition, the flask was removed from the cold bath and allowed to warm up to ambient temperature (about 20° C.), and was maintained at this temperature for one hour, whilst still stirring.

A sample of the product was removed and the rest was heated up to 100° C. over a period of one hour. Once the temperature of 100° C. was attained, stirring was stopped, the solid allowed to settle and the supernatant liquor decanted off. The solid was then washed three times with the hydrocarbon diluent by resuspension, settling and decanting, whilst still heating at the same rate. The solid was then resuspended in the hydrocarbon diluent to give a suspension containing one Mole of TiCl$_3$ per liter of suspension.

A sample of the suspension containing 600 mM of TiCl$_3$ was heated, whilst stirring, to 120° C. over a time of 1¼ hours and phenoxathiin was then added in an amount of one mole phenoxathiin per mole TiCl$_3$. The mixture was maintained with stirring, at 120° C. for 8 hours. Stirring was then ceased, the supernatant liquor was decanted off from the settled solid, and washed (by suspension, settling and decanting) three times with 0.5 liters of the hydrocarbon diluent whilst continuing to heat at the same rate. The solid was finally resuspended in 1.2 liters of the hydrocarbon diluent.

EXAMPLE 85

The product of Example 84 was used to polymerise propylene using the technique of Example 2. The polymer product contained 0.7% by weight of diluent soluble polymer and 1.0% by weight of residual soluble polymer. The polymerisation activity was 9.0 g/mM hr.at. (see note (m) to Table 7). The polymer product had a flexural modulus of 1.63 GN/m$^2$ (see note (e) in Example 2) and a melt flow index of 21 (see note (d) in Example 2).

We claim:

1. A process for the production of a transition metal composition in which at least one compound of a transition metal of Groups IVA to VIA of the Periodic Table is mixed with at least one organo-compound of aluminium or of a non-transition metal of Groups IA or IIA of the Periodic Table to obtain a solid reaction product, and the solid reaction product is contacted with at least one sulphur-containing organic compound of the formula

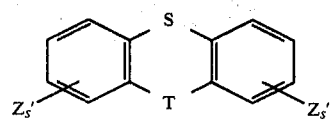

in an amount of from 0.01 up to 2.00 moles, of the sulphur-containing organic compound for each gramme atom of the transition metal which is present in the solid reaction product, and at a temperature which is in the range from 60° C. up to 160° C., for at least a part of the period of contacting wherein Z′, or each Z′, is, independently, a halogen atom, an alkyl, aryl, alkoxy, aryloxy, alkylthio or arylthio group, or a group —NR$^3$R$^4$;
R$^3$ is a hydrogen atom or a hydrocarbyl group;
R$^4$ is a hydrocarbyl group;
each s is, independently, an integer from 0 up to 5; and
T is an oxygen or a sulphur atom.

2. The process of claim 1, in which titanium tetrachloride is mixed with an organo-aluminium compound at a temperature in the range from −100° C. up to +20° C. for a time of from 30 minutes up to 20 hours.

3. The process of claim 1 in which a dialkyl aluminium halide, or a mixture including a dialkyl aluminium halide, is mixed with titanium tetrachloride in an amount sufficient to provide from 0.6 up to 1.5 moles of the dialkyl aluminium halide for each mole of the titanium tetrachloride.

4. The process of claim 1 in which an aluminium trialkyl is mixed with titanium tetrachloride in an amount of from 0.20 up to 0.40 moles of the aluminium trialkyl for each mole of the titanium tetrachloride.

5. The process of claim 1 in which the solid reaction product is removed from the reaction medium and washed with an inert liquid hydrocarbon before the solid reaction product is contacted with the sulphur compound.

6. The process of claim 1 in which the solid reaction product is subjected to a preliminary heating step before contacting with the sulphur compound.

7. The process of claim 1 in which the solid reaction product is contacted with at least 0.02, and not more than 1.50, moles of the sulphur compound for each gramme atom of the transition metal product which is present in the solid reaction product.

8. The process of claim 1 in which the solid reaction product and the sulphur compound are mixed at a temperature below 60° C. and the mixture is then heated to a temperature of from 60° C. up to 160° C.

9. The process of claim 1 in which after heating the mixture of the solid reaction product and the sulphur compound at the temperature in the range from 60° C. up to 160° C., the solid reaction product is washed several times and the liquor removed from the first washing stage is recycled and used to treat a further sample of the solid reaction product.

10. The process of claim 1 in which the sulphur compound is thianthrene, phenoxathiin or 3-methyl-phenoxathiin.

11. An olefine polymerisation catalyst comprising
   (1) a transition metal composition which is the product obtained by the process of claim 1; and
   (2) at least one organo-metallic compound of aluminium or of a non-transition metal of Group IIA of the Periodic System, or a complex of an organo-metallic compound of a non-transition metal of Group IA or IIA of the Periodic System and an organoaluminium compound.

12. The catalyst of claim 11 which, in addition to any organo-Lewis Base compound which is present in component (1) of the catalyst system, also includes (3) at least one additional organo-Lewis Base compound which is a sulphur-containing organic compound of the formula

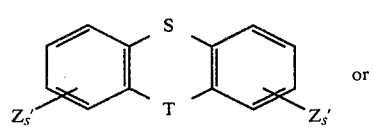

a compound of one of the formulae

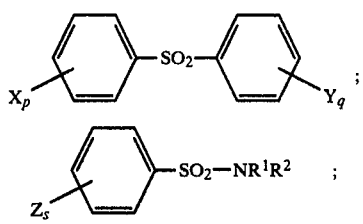

$R^5R^6R^7P(O)_m$;

$R^9R^{10}R^{11}N$;

or $R^{12}R^{13}P(Q)_zED$ wherein

X, or each X, is, independently, a halogen atom, an alkyl, aryl, alkoxy, aryloxy, alkylthio, or arylthio group, or a group —NR³R⁴, or two groups X can together form a saturated or unsaturated hydrocarbon ring;

Y, or each Y, is, independently, a halogen atom, an alkyl, aryl, alkoxy, aryloxy, alkylthio, or arylthio group, or a group —NR³R⁴, or two groups Y can together form a saturated or unsaturated hydrocarbon ring; or a group X and a group Y may be replaced by a link between the two phenyl groups attached to the —SO₂— group, the linkage being either direct or through a group —O—, —CH₂—, —NR³—, —S— or —CO—;

Z, or each Z, is, independently, a halogen atom, an alkyl, aryl, alkoxy, aryloxy, alkylthio, or arylthio group, or a group —NR³R⁴, or two groups Z can together form a saturated or unsaturated hydrocarbon ring;

$R^1$ is a hydrocarbyl group;

$R^2$ is a hydrocarbyl group or a group

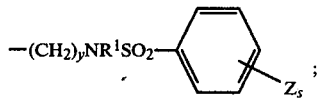

$R^3$ is as defined;

$R^4$ is as defined;

p, q and s are each, independently, an integer from 0 up to 5;

y is a positive integer;

$R^5$, $R^6$ and $R^7$ are each independently an alkyl or aryl group, or a group —NR₂⁸ or —OR⁸;

$R^8$ is an alkyl group of 1 to 4 carbon atoms;

$R^9$ and $R^{10}$ are each independently a hydrocarbyl group;

$R^{11}$ is a hydrogen atom, an alkyl group or a group

—$C_nH_{2n}NR^9R^{10}$, OR $R^9$ and $R^{10}$, optionally with $R^{11}$, together form a substituted or unsubstituted, saturated or unsaturated, condensed or uncondensed ring system;

$R^{12}$ is a halogen atom, a hydrocarbyl group, a group —NR¹⁴ or —OR¹⁴, a heterocyclic group or a group (E-L-G);

$R^{13}$ is a halogen atom, a hydrocarbyl group, a group —NR₂¹⁴ or —OR¹⁴, a heterocyclic group, a group (E-L-G) or ED;

$R^{14}$ is a hydrocarbyl group; each E is —O—, —S—, or —NR¹⁴—, and may be the same or different;

G is —OR¹⁴, —SR¹⁴, —NR₂¹⁴, —PR₂¹⁴ or a heterocyclic ring system whereof the heteroatom is O, S, N or P;

D is a group —LG or —P(Q)$_z$R¹²R¹³, or, when $R^{13}$ is ED, both the D groups may together form a group —L—;

L is a bivalent hydrocarbyl radical such that E and G, or E and E are separated by not more than 3 carbon atoms;

Q is an oxygen or sulphur atom;

m is 0 or 1;

n is 1, 2 or 3; and z is 0 or 1.

13. The catalyst of claim 11 which includes (4) a substituted or unsubstituted polyene.

14. The process for the production of a polymer or copolymer of an olefine monomer wherein at least one olefine monomer, or a mixture of at least one olefine monomer and ethylene, is contacted with the polymerisation catalyst of claim 11.

15. The process of claim 14 in which the catalyst contains titanium trichloride, propylene is polymerised to give a polymer having a flexural modulus of at least 1.00 GN/m² and polymerisation is continued to give a polymer containing not more than about 100 parts per million by weight of titanium derived from the residual catalyst in the polymer.

16. The process of claim 14 in which propylene is copolymerised with ethylene to give a copolymer having a low temperature brittle point in the range −20° C. to −50° C. and a flexural modulus of at least 1.00 GN/m².

* * * * *